Patented Sept. 16, 1930

1,776,087

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY

PROCESS FOR MAKING INACTIVE MENTHOL

No Drawing. Application filed June 29, 1927, Serial No. 202,458, and in Germany December 15, 1926.

The present invention refers to the manufacture of inactive menthol (the racemate of natural menthol) from a new isomer of inactive menthol by a catalytic transformation (isomerization).

The new isomer of inactive menthol shall be called "solid inactive isomenthol," for it is an alcohol of the inactive isomenthone (the semicarbazone of the latter having the melting-point of 217 degrees centigrade). The solid inactive isomenthol is characterized by its melting-point of 52–53 degrees centigrade, its boiling-point of 218 degrees centigrade under 760 mm. pressure, and its acid phthalic ester having the melting-point of 113–115 degrees centigrade, and its paranitro-benzoic ester having the melting-point of 65 degrees centigrade. The solid inactive isomenthol is devoid of the smell and taste of the inactive menthol (the racemate of natural menthol).

The solid inactive isomenthol, described partly in our copending application 146,564 filed November 5th, 1926, is obtained by subjecting the synthetically obtained mixtures of the various inactive isomeric methols to a fractional distillation, viz, separating the fraction boiling between 212–214 degrees centigrade, containing inactive neomenthol, separating the second fraction boiling between 215–217 degrees centigrade at 760 mm. pressure containing inactive menthol and separating the third fraction boiling at 218 degrees centigrade containing solid inactive isomenthol.

Solid inactive isomenthol can also be obtained by subjecting crude inactive menthol—obtained for instance by a freezing out process from the synthetically obtained menthols mixtures—to a fractional distillation, whereby the solid inactive isomenthol is separated as highest boiling fraction.

The solid inactive isomenthol can also be obtained by saponifying the mother liquors of crystallization left in purifying the still slightly impure inactive menthol by conversion into the crystalline esters according to the process described in U. S. Patent No. 1,672,346, and subjecting the menthols mixture obtained by saponifying—in which the solid inactive isomenthol preponderates—to fractional distillation, whereby the solid inactive isomenthol is separated as the fraction of the highest boiling point (218 degrees centigrade at 760 mm. pressure).

The slightly impure solid inactive isomenthol can be obtained in pure state, melting-point 52–53 degrees centigrade, by another fractional distillation. The pure solid inactive isomenthol can also be obtained from the still slightly impure solid inactive isomenthol by conversion of the latter into the crystalline esters, purifying the esters by crystallization and saponifying the pure esters.

The solid inactive isomenthol prepared by the described processes or in any other way may be transformed into inactive menthol by a catalytic isomerization of the solid inactive isomenthol.

Suitable catalysts for the isomerization according to the present process are the same as for hydrogenation, for example, nickel, cobalt, copper, platinum, palladium or mixtures of these metals in a finely divided condition or distributed on carriers such as kieselguhr, asbestos, pumice stone, barium sulphate and the like. In place of the metals their oxygen compounds or their readily decomposable carbon-containing salts, such as carbonates and formates may also be employed.

The transformation can be effected by means of hydrogenating catalysts in presence of hydrogen under ordinary or raised pressure with the use of heat and agitation, and separating the crude inactive menthol from the resulting mixture by freezing-out or fractional distillation by physical methods described in U. S. Patent No. 1,625,771 for example, purifying the crude inactive menthol by way of its esters, and transforming the residual isomers anew. The solid inactive isomenthol may also be added to fresh quantities of thymol, inactive menthone or isomenthone or inactive piperitone ($\Delta'$-p-menthen-3-one), for hydrogenation and simultaneous trasformation. Again, the transformation of the solid inactive isomenthol may be effected simultaneously with admixture of other isomers of inactive menthol.

The solid inactive isomenthol may also be converted into the corresponding ketone— inactive isomenthone—by oxidation with chromic acid according to Beckmann's process (Annalen der Chemie, vol. 250, p. 325), or may also be converted into a mixture of inactive menthone and isomenthone by dehydrogenation with the assistance of the same catalysts as for hydrogenation, but at higher temperatures than for the hydrogenation, and the said ketones may be subjected, alone or in mixture with thymol, inactive piperitone, as well as inactive menthone and isomenthone of other preparation, to hydrogenation.

The solid isomenthol has not hitherto been dealt with in the literature, and therefore its behaviour has until now been entirely unknown. Its transformation into inactive menthol is of technical importance, since it enables a by-product of low value to be converted into the valuable inactive menthol.

*Example 1.*—100 parts of solid inactive isomenthol are treated with hydrogen to about 180 degrees centigrade and under a pressure of about 20–30 atmospheres, in presence of 5 parts of a nickel catalyst, and kept in agitation, until the transformation has attained a state of equilibrium, that is to say, the maximum production of inactive menthol has been effected, the time required being about 24 hours. The inactive menthol is separated from the resulting mixture of isomers by freezing out or fractional distillation, and is further purified by way of the esters. The isomeric menthols left from the separation and purification are subjected to further transformation (see Example 3).

*Example 2.*—A mixture of 50 parts of solid inactive isomenthol and 50 parts of thymol is hydrogenated and simultaneously transformed by means of a hydrogenating catalyst and hydrogen, as in Example 1, and the resulting menthols mixture subjected to further treatment as described therein.

*Example 3.*—A mixture of 33 parts of solid inactive isomenthol, 33 parts of a mixture of liquid isomeric menthols left over from the process described in Example 1, and 34 parts of thymol or inactive menthone or inactive isomenthone or inactive piperitone is hydrogenated with a hydrogenating catalyst and hydrogen, and simultaneously transformed, as in Example 1, the resulting menthols mixture being subjected to further treatment as described therein.

The crude inactive menthol which is obtained according to the process described may be purified by converting it into the esters or into the acid esters, for example the ester of the paranitrobenzoic acid, or the carbonate, borate, acid phthalate or succinate of the inactive menthol, crystallizing the esters and then saponifying the pure esters or acid esters, (see U. S. Patent No. 1,672,346). In this way a completely pure inactive menthol—the racemate of natural menthol—melting-point 35–36 degrees centigrade is obtained.

We claim:

1. The process for manufacturing inactive menthol, the racemate of natural menthol, which consists in heating solid inactive isomenthol with hydrogenating catalysts and hydrogen with simultaneous agitation and separating from the reaction product inactive menthol by physical fractionation.

2. The process for manufacturing inactive menthol, the racemate of natural menthol, which consists in heating solid inactive isomenthol with hydrogenating catalysts and hydrogen with simultaneous agitation and separating from the reaction product inactive menthol by fractional distillation.

3. The process for manufacturing inactive menthol, the racemate of natural menthol, which consists in heating solid inactive isomenthol with hydrogenating catalysts and hydrogen with application of pressure and agitation and separating from the reaction product inactive menthol by physical fractionation.

4. The process for manufacturing inactive menthol, the racemate of natural menthol, which consists in heating solid inactive isomenthol admixed with materials differing from menthol only by smaller contents of hydrogen, with hydrogenating catalysts and hydrogen with the application of pressure and agitation and separating from the reaction product inactive menthol by physical fractionation.

5. The process for manufacturing inactive menthol, the racemate of natural menthol, which consists in heating solid inactive isomenthol admixed with thymol, with hydrogenating catalysts and hydrogen with the application of pressure and agitation and separating from the reaction product inactive menthol by physical fractionation.

6. The process for manufacturing inactive menthol, the racemate of natural menthol, which consists in heating solid inactive isomenthol admixed with other isomers of inactive menthol with hydrogenating catalysts and hydrogen and separating from the reaction product inactive menthol by physical fractionation.

7. The process for manufacturing inactive menthol, the racemate of natural menthol, which consists in heating solid inactive isomenthol with hydrogenating catalysts and hydrogen with simultaneous agitation and separating from the reaction product inactive menthol by fractional crystallization.

In testimony whereof we hereunto affix our signatures.

KARL SCHÖLLKOPF.
ARTHUR SERINI.